United States Patent
Kim et al.

(10) Patent No.: US 8,497,461 B2
(45) Date of Patent: Jul. 30, 2013

(54) LIGHT SENSOR CIRCUIT AND DRIVING METHOD THEREOF

(75) Inventors: Do-Youb Kim, Yongin (KR); Yong-Sung Park, Yongin (KR); Tae-Jin Kim, Yongin (KR); Deok-Young Choi, Yongin (KR); Joo-Hyeon Jeong, Yongin (KR); Soon-Sung Ahn, Yongin (KR); In-Ho Choi, Yongin (KR); Brent Jang, Yongin (KR); Ki-Ju Im, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 330 days.

(21) Appl. No.: 13/064,115

(22) Filed: Mar. 7, 2011

(65) Prior Publication Data

US 2011/0233387 A1 Sep. 29, 2011

(30) Foreign Application Priority Data

Mar. 23, 2010 (KR) .................. 10-2010-0025659

(51) Int. Cl.
*G01J 1/46* (2006.01)

(52) U.S. Cl.
USPC .............. 250/214 B; 250/214 AL; 250/214.1; 358/4.07

(58) Field of Classification Search
USPC .............. 250/214.1, 214 AL, 214 B, 559.22, 250/559.38; 356/4.01, 4.07, 5.01; 340/545.3, 340/552
See application file for complete search history.

(56) References Cited

U.S. PATENT DOCUMENTS

| | | | |
|---|---|---|---|
| 7,432,659 B2 | 10/2008 | Park et al. | |
| 7,470,886 B2 | 12/2008 | Shimizu et al. | |
| 7,745,776 B2* | 6/2010 | Wada et al. | 250/214 R |
| 8,058,603 B2* | 11/2011 | Park et al. | 250/208.2 |
| 2005/0269487 A1 | 12/2005 | Ozawa | |
| 2006/0126683 A1 | 6/2006 | Kang et al. | |
| 2008/0157682 A1 | 7/2008 | Kwon | |
| 2008/0158211 A1 | 7/2008 | Kwon | |

FOREIGN PATENT DOCUMENTS

| | | |
|---|---|---|
| EP | 1939847 A2 | 7/2008 |
| EP | 1940161 A2 | 7/2008 |
| KR | 10-2006-0065865 A | 6/2006 |
| KR | 10-2006-0094181 A | 8/2006 |
| KR | 10-2006-0109293 A | 10/2006 |
| KR | 10-0824859 B1 | 4/2008 |
| KR | 10 2009-0089588 A | 8/2009 |

OTHER PUBLICATIONS

European Search Report in EP 11250336.2-2217, dated Jul. 1, 2011 (Kim, et al.).
Korean Office Action in KR 10-2010-0025659, dated Dec. 5, 2011 (Kim, et al.).

* cited by examiner

*Primary Examiner* — Tony Ko
(74) *Attorney, Agent, or Firm* — Lee & Morse, P.C.

(57) ABSTRACT

Embodiments provide a light sensor circuit for a flat panel display which improves resolution at low luminance and increases the range of sensible ambient light by divisionally driving a frame period, in which light is sensed, into a plurality of sub-frames, and a method of driving the light sensor circuit.

19 Claims, 3 Drawing Sheets

LIGHT SENSOR CIRCUIT AND DRIVING METHOD THEREOF

BACKGROUND

1. Field

Embodiments relate to a light sensor circuit, particularly a light sensor circuit that expands the range of sensible ambient light and improves resolution at low illumination, and a method of driving the light sensor circuit.

2. Description of the Related Art

Flat panel displays include organic light emitting displays, liquid crystal displays, and plasma displays, etc. Flat panel displays are thinner, lighter, and consume less power than CRTs (Cathode Ray Tube), such that they have rapidly replaced the CRTs. Of the flat panel displays, organic light emitting displays and liquid crystal displays can be easily manufactured in a small size and can be used for a long period of time with a battery, such that they are selected for the display of many portable electronic devices.

However, although a user can adjust the brightness of existing organic light emitting displays and liquid crystal displays, these displays are designed to display images at a uniform luminance irrespective of ambient light. Therefore, visibility for these displays is an issue, because the uniform luminance appears too high in a dark place and too low in a bright place, e.g., in sunlight.

Further, since flat panel displays are set be uniform in luminance of a picture in the related art as described above, they are disadvantageous in that the luminance of a picture is unnecessarily high and accordingly power consumption increases, when being used for a long period of time in a relatively dark place with relatively small luminance of ambient light. In order to overcome this issue, some displays may automatically adjust luminance by sensing ambient light using a light sensor circuit.

SUMMARY

Embodiments provide a light sensor circuit, including a first transistor connected between a first reference voltage and a second power source, a second transistor connected between a gate electrode and a second electrode of the first transistor, the second transistor including a gate transistor receiving a first control signal from the gate electrode, a third transistor connected between the first reference voltage and the first transistor, the third transistor including a gate electrode receiving a second control signal, a fourth transistor connected between the second power and the first transistor, the fourth transistor including a gate electrode receiving an inverted second control signal, a light receiving element connected between the second reference voltage and the third reference voltage, a fifth transistor connected between the second reference voltage and a cathode of the light receiving element, the fifth transistor including a gate electrode receiving the first control signal, a first capacitor connected between the cathode of light receiving element and the third reference voltage, a sixth transistor connected between the cathode of the light receiving element and a first electrode of the first capacitor, the sixth transistor including a gate electrode receiving a third control signal, and a second capacitor connected between the gate electrode of the first transistor and a first electrode of the first capacitor.

The light sensor circuit may include a seventh transistor connected between the first electrode of the first transistor and a first side of an output load, the seventh transistor including a gate electrode receiving a fourth control signal, and an eighth transistor connected between an output signal line extending to a second side of the output load and the first power source, the eighth transistor including a gate electrode receiving an initializing signal.

The light receiving element may be any one of a p-i-m (p-intrinsic-metal) diode, a PIN diode, a PN diode, and a photo coupler.

The first reference voltage and the second reference voltage may have a high-level voltage value.

The third reference voltage $V_{REF3}$ and the second power source VSS may be implemented by low-level voltage or a grounding power source GND.

At least one of the second transistor, the fifth transistor, and the sixth transistor may be a dual gate type.

The light sensor circuit may include a ninth transistor supplied with the first control signal inverted by the gate electrode, the ninth transistor having first and second electrodes connected with the gate electrode of eh first transistor, and a tenth transistor supplied with a third control signal inverted by the gate electrode, the tenth transistor having first and second electrodes connected with a first electrode of the first capacitor.

Embodiments provide a method of driving a light sensor circuit in which one frame is divided into three periods t1, t2, and t3 and the light sensor circuit according to claim 1 operates in the frame period, the method including implementing a light receiving element in a reverse bias state by storing threshold voltage of a first transistor in a second capacitor and charging the cathode of the light receiving element to second reference voltage in the first period t1, discharging the first capacitor, which stores voltage by the light leakage current generated in accordance with the amount of light traveling into the light receiving element, to correspond to light leakage current in the second period t2, and outputting information on the voltage discharged in accordance with the light leakage current to an output signal line in the third period t3.

Implementing the light receiving element may include receiving a first control signal as a selection signal, initializing the voltage of a gate electrode node of the first transistor into a second power source, after initializing the voltage, receiving the first control signal and a second control signal as selection signal, and charging the gate electrode node of the first transistor with "first reference voltage—threshold voltage of the first transistor".

Discharging the first capacitor may include providing a third control signal as a selection signal to turn on a sixth transistor to then correspondingly decrease the voltage of the gate electrode node of the first transistor is by up to the amount of voltage change of the first capacitor.

Discharging the first capacitor may further include receiving an initializing signal as a selection signal and turning on an eighth transistor in a predetermined period of the second period, and then charging an output line with a first power source.

Outputting information may include providing a fourth signal as a selection signal to turn on a seventh transistor is turned on to then discharge the voltage in accordance with the light leakage current is output to an output signal line through the seventh transistor.

Embodiments provide a method of driving a light sensor circuit in which one frame is composed of a plurality of sub-frames, the sub-frames are divided into three periods t1, t2, and t3 and the light sensor circuit according to claim 1 operates in the periods, the method including implementing a light receiving element in a reverse bias state by storing threshold voltage of a first transistor in a second capacitor and charging the cathode of the light receiving element to second reference voltage in the first period, discharging the first capacitor, which stores voltage by the light leakage current generated in accordance with the amount of light traveling into the light receiving element, to correspond to light leakage current in the second period, and outputting information on the voltage discharged in accordance with the light leakage current to an output signal line in the third period, wherein the second period of each of the sub-frame is sequentially shortened by a multiple of 2 from a second period time T0 of the first sub-frame.

Low-luminance light may be sensed in the first sub-frame having the longest second period and high-luminance light is sensed in the last sub-frame having the shortest second period.

Implementing the light receiving element in a reverse bias state may include receiving a first control signal as a selection signal, initializing the voltage of a gate electrode node of the first transistor into a second power source, receiving the first control signal and a second control signal as selection signals after initializing, and charging the gate electrode node of the first transistor with "first reference voltage—threshold voltage of the first transistor."

Discharging the first capacitor may include providing a third control signal as a selection signal to turn on a sixth transistor is turned on then to decrease the voltage of the gate electrode node of the first transistor by up to the amount of voltage change of the first capacitor.

Discharging the first capacitor may further include receiving an initializing signal as a selection signal to turn on an eighth transistor in a predetermined period of the second period, and then charging an output line with a first power source.

Outputting information may include providing a fourth signal as a selection signal to turn on a seventh transistor is turned on, and then the voltage discharged in accordance with the light leakage current is output to an output signal line through the seventh transistor.

Embodiments provide a method of sensing light using a light sensor circuit including providing another light sensor circuit, shielding the another light sensor circuit from light, and subtracting an output of the another light sensor circuit from an output of the light sensor circuit to provide a corrected output.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0025659, filed on Mar. 23, 2010, in the Korean Intellectual Property Office, and entitled: "Light Sensor Circuit and Driving Method Thereof" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1A:
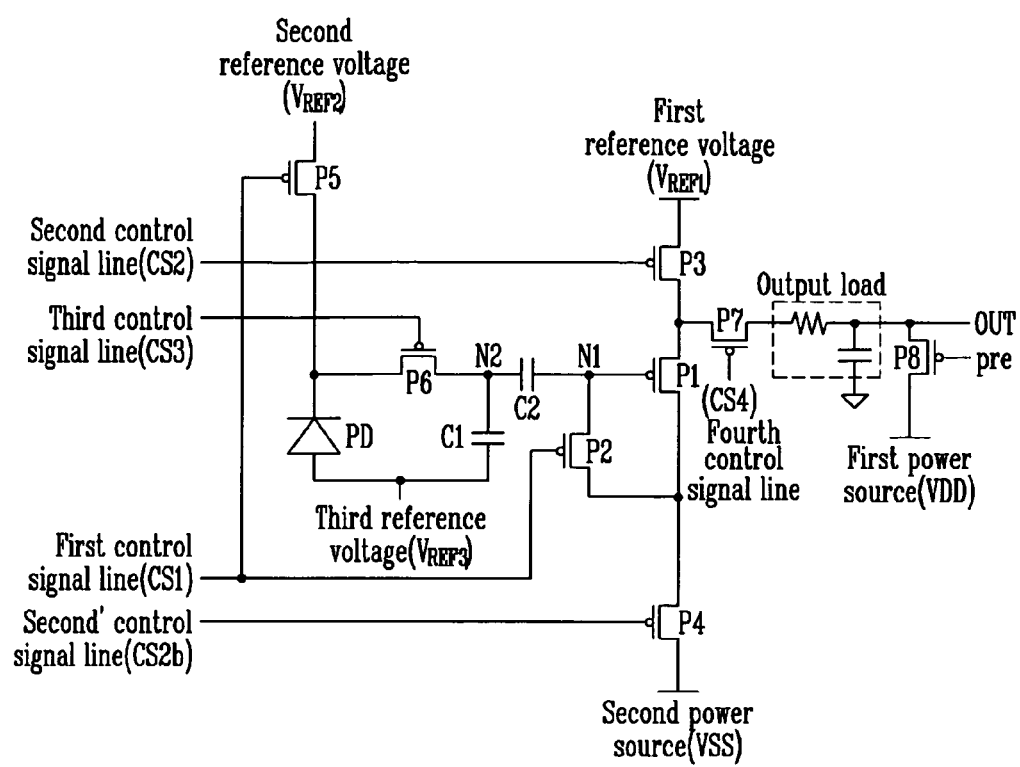
FIG. 1A and FIG. 1B illustrate circuit diagrams of the configuration of light sensor circuit according to embodiments.
Figure 1B:
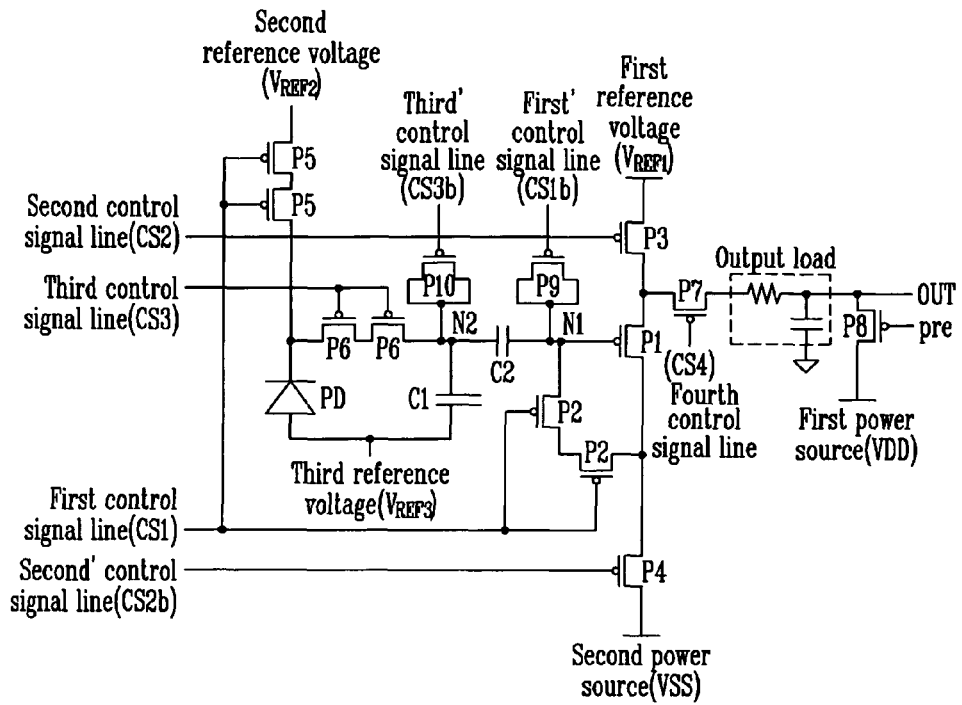

FIG. 1A and FIG. 1B illustrate circuit diagrams of a light sensor circuit according to embodiments. A light sensor circuit according to embodiments is a source follower type of sensor circuit, which has the advantage of having good linear input/output characteristics.

Referring to FIG. 1A first, a light sensor circuit according to an embodiment of the present invention includes first to eighth transistors P1 to P8, first and second capacitors C1 and C2, and a light receiving element PD. While the first and eighth transistors P1 to P8 were implemented as P-type transistors in this embodiment of the present invention, this is just one example and embodiments are not limited thereto.

The first transistor P1 has a gate electrode connected to a first node N1 and first and second electrodes are electrically connected to a first reference voltage $V_{REF1}$ and a second power source VSS, respectively. In this configuration, the first reference voltage $V_{REF1}$ is a high-level voltage value and the second power source VSS is may be implemented by a low-level voltage value or a ground power source GND. In this embodiment, the first transistor P1 operates in a source follower type, in which the first electrode electrically connected with the first reference voltage $V_{REF1}$ serves as a source electrode and the second electrode connected with the second power source VSS serves as a drain electrode.

The second transistor P2 is connected between the gate electrode and the second electrode (drain electrode) of the first transistor P1, such that when the second transistor P2 is turned on, the first transistor P1 is diode connected. In particular, first and second electrodes of the second transistor P2 are connected with the gate electrode and the second electrode of the first transistor P1, respectively. A gate electrode of the second transistor P2 is connected with a first control signal line CS1.

A third transistor P3 is connected between the first electrode (source electrode) of the first transistor P1 and the first reference voltage $V_{REF1}$, such that when the third transistor P3 is turned on, the first electrode of the first transistor P1 is electrically connected with the first reference voltage $V_{REF1}$. In particular, first and second electrodes of the third transistor P3 are connected with the reference voltage and the first electrode of the first transistor, respectively. A gate electrode of the third transistor P3 is connected with a second control signal line CS2.

A fourth transistor P4 is connected between the second electrode (drain electrode) of the first transistor P1 and the second power source VSS, such that when the fourth transistor P4 is turned on, the second electrode of the first transistor P1 is electrically connected with the second power source VSS. In particular, first and second electrodes of the fourth transistor P4 are connected with the second electrode of the first transistor and the second power source VSS. A gate electrode of the fourth transistor P4 is connected with a second' control signal line CS2b. In this configuration, the control signal applied to the second control signal line CS2, is inverted and transmitted to the 2-2 control signal line CS2b.

The light receiving element PD is connected between a second reference voltage $V_{REF2}$ and a third reference voltage $V_{REF3}$, and discharges the second capacitor CS to a predetermined voltage by flowing light leakage current corresponding to the magnitude of external light in reverse bias. In particular, a cathode of the light receiving element PD is electrically connected with the second reference voltage $V_{REF2}$ and an anode of the light receiving element PD is connected with the third reference voltage $V_{REF3}$.

A fifth transistor P5 is connected between the cathode of the light receiving element PD and the second reference voltage $V_{REF2}$, such that the cathode of the light receiving element PD is electrically connected with the second reference voltage $V_{REF2}$ only when the fifth transistor P5 is turned on. In particular, first and second electrodes of the fifth transistor P5 are connected with the second reference voltage $V_{REF2}$ and the cathode of the light receiving element PD, respectively. A gate electrode of the fifth transistor P5 is connected with the first control signal line CS1.

The light receiving element PD may be any one selected from a p-i-m (p-intrinsic-metal) diode, a PIN diode, a PN diode, a photo coupler, and an equivalent. The second reference voltage $V_{REF2}$ is a high-level voltage value and the second power source VSS is may be implemented by a low-level voltage value or a ground power source GND.

The second capacitor C2 stores the voltage applied to the gate electrode of the first transistor T1, such that it compensates the threshold voltage of the first transistor T1. Therefore, the first electrode of the second capacitor C2 is connected with the first node N1, where the gate electrode of the first transistor T1 is connected, and the second electrode is connected with the second node N2.

The first capacitor C1 is connected between the second node N2 and the third reference voltage $V_{REF3}$. The first capacitor C1 is connected in parallel with the light receiving element PD and improves signal maintaining characteristics by improving the reverse bias capacity of the light receiving element. In particular, the first electrode of the first capacitor C1 is electrically connected with the cathode electrode of the light receiving element PD and the second electrode is connected with the anode electrode.

A sixth transistor P6 is connected between the cathode of the light receiving element PD and the first electrode of the first capacitor C1, such that the cathode of the light receiving element PD is electrically connected with the first electrode of the first capacitor C1, only when the sixth transistor P6 is turned on. In particular, first and second electrodes of the sixth transistor P6 are connected with the cathode of the light receiving element PD and the second node N2, respectively. A gate electrode of the sixth transistor P6 is connected with a third control signal line CS3.

A seventh transistor P7 has first and second electrodes connected between the first electrode of the first transistor P1 and one side of an output load, and a gate electrode of the seventh transistor P7 is connected with a fourth control signal line CS4.

An eighth transistor P8 is connected to an output signal line OUT extending to the other side of the output load, in which a first electrode of the eighth transistor P8 is connected to the output signal line OUT, a second electrode is connected with a first power source VDD having a high-level voltage value, and a gate electrode is connected to an initializing signal line pre.

In this configuration, the output load may be, e.g., an internal load of an analog-digital converter. In this configuration, all of the first reference voltage $V_{REF1}$, the second reference voltage $V_{REF2}$, and the first power source VDD have a high-level voltage value and can be implemented at the same level. In this configuration, both the third reference voltage $V_{REF3}$ and the second power source VSS are implemented by a low level or a ground power source and may have the same voltage value.

Next, referring to FIG. 1B, a light sensor circuit according to another embodiment is shown. The embodiment of FIG. 1B includes all of the elements of the embodiment shown in FIG. 1A. Therefore, the same components are represented by the same reference numeral and detailed description of them is not repeated.

In particular, the embodiment shown in FIG. 1B is different from the embodiment shown in FIG. 1A in that a ninth transistor P9 and a tenth transistor P10 are further included, and the second transistor P2, the fifth transistor P5, and the sixth transistor P6 are implemented in a dual gate type.

In this configuration, the ninth transistor P9 and the tenth transistor P10 are provided to reduce switching noise generated by the second transistor P2 and the sixth transistor P6, respectively. Therefore, the ninth transistor P9 has a gate electrode connected to a first' control signal line CS1$b$ to which an inverted first control signal is applied, and first and second electrode connected to the first node N1. Further, the tenth transistor P10 has a gate electrode connected to a third' control signal line CS3$b$ to which an inverted third control signal is applied, and first and second electrodes connected to the second node N2.

Since the switching noise generated by the second transistor P2 and the sixth transistor P6 may largely influence the gate electrode of the first transistor P1, in order to overcome this problem, the ninth transistor P9 and the tenth transistor P10 connected with the first and second electrodes (source and drain electrodes) are provided to minimize the switching noise.

Further, the second transistor P2 and the sixth transistor P6 are implemented in a dual gate type to prevent the leakage current generated from each of the transistors itself from influencing the gate node of the first transistor P1, and the fifth transistor P5 is implemented in a dual gate type to prevent the leakage current of itself from influencing the light leakage current generated from the light receiving element PD.

However, the basic operations of the light sensing operation are the same as in the embodiments shown in FIG. 1A and FIG. 1B.

Figure 2:
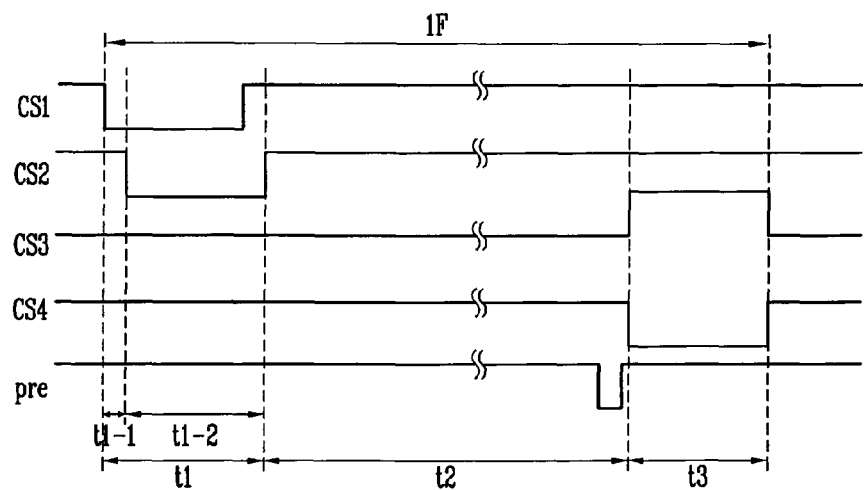
FIG. 2 illustrates a timing diagram showing the operation of the light sensor circuit shown in FIG. 1A or 1B.

FIG. 2 is a timing diagram for illustrating the operation of the light sensor circuit shown in FIG. 1A. The operation of a light sensor circuit according to an embodiment is described with reference to FIG. 1A and FIG. 2 as follows.

However, since the transistors included in the light sensor circuit shown in FIG. 1 are implemented as P-type transistors, control signals, selection signals turning on the transistors, are applied at a low level. In contrast, when the transistors are implemented as N-type transistors, they would be turned on when the control signals are applied as selection signals at a high level.

As shown in FIG. 2, a light sensor circuit according to this embodiment of operates in by dividing a period of one frame into three periods t1, t2, and t3. In this configuration, the gate electrode of the first transistor P1 is initialized in the first period (t1, Reset), changes in light due to the light receiving element PD is sensed in the second period (t2, Integration), and voltage values changed by sensing the light is output through an output terminal in the third period (t3, Readout).

In this configuration, first to fourth control signals CS1 to CS4 and an initial signal pre, first to third reference voltages $V_{REF1}$, $V_{REF2}$, and $V_{REF3}$ and first power source VDD, and a second power source VSS are applied to the light sensor circuit, respectively, in order to achieve the above operations in the periods t1, t2, and t3.

In this configuration, the first and second reference voltages $V_{REF1}$, $V_{REF2}$ and the first power source VDD have a high-level voltage value, and the third reference voltage $V_{REF3}$ and the second power source VSS may have a low-level voltage value or may be by a grounding power source.

All of the high-level voltage value and both of the low-level voltage values may be set at the same level, respectively.

The first period t1 may be divided into a 1-1 period t1-1 and a 1-2 period t1-2. During the 1-1 period t1-1, the first control signal CS1 is provided at a low level and the second control signal CS2 is provided at a high level. During the 1-2 period t1-2, the first and second control signals CS1 and CS2 are both provided at a low level, or the first control signal CS1 is provided at a high level and the second control signal CS2 is provided at a low level.

In the 1-1 period t1-1, since the first control signal CS1 is applied at a low level, the second transistor P2 and the fifth transistor P5 are turned on. In the 1-1 period t1-1, since the second control signal CS2 is applied at a high level, the third transistor P3 is turned off. In the 1-1 period t1-1, since an inverted second control signal CS2b is applied to the fourth transistor P4, the fourth transistor P4 is turned on.

As the second transistor P2 and the fourth transistor P4 are turned on, the gate electrode node of the first transistor P1, i.e., the first node N1, is discharged to the second power source VSS. Further, as the fifth transistor P5 is turned on, the cathode electrode of the light receiving element PD is charged to the second reference voltage $V_{REF2}$.

Thereafter, in the 1-2 period t1-2, since the second controls signal CS2 is applied at a low level, the inverted second control signal CSb becomes at a high level, such that the fourth transistor P4 is turned off and the third transistor P3 is turned on. Accordingly, the gate electrode node of the first transistor P1 is charged to a voltage of "first reference voltage $V_{REF1}$—threshold voltage of the first transistor $V_{TH, P1}$".

In other words, the gate electrode of the first transistor P1 is gradually increased from the second power source VSS by the source follower operation and charged up to the voltage "$V_{REF1} - V_{TH, P1}$".

Therefore, the second node N2 is charged to the second reference voltage $V_{REF2}$ and the first node N1 is charged to "first reference voltage $V_{REF1}$—threshold voltage of the first transistor $V_{TH, P1}$", and the second capacitor C2 connected between the first node N1 and the second node N2 is charged with the voltage corresponding to the difference voltage.

Further, the first capacitor C1 connected between the second node N2 and the third reference voltage $V_{REF3}$ is charged with voltage of "$V_{REF2} - V_{REF3}$".

Next, in the second period t2, the third control signal CS3 is applied at a low level and the other control signals are all applied at a high level. In other words, only the sixth transistor P6 is turned on and the other transistors are all turned off.

In this configuration, since the cathode electrode of the light receiving element PD was charged to the high-level second reference voltage $V_{REF2}$ in the first period, the light receiving element PD operates in a reverse bias state. Therefore, the voltage stored in the first capacitor C1 by the light leakage current generated in accordance with the amount of light traveling into the light receiving element PD is discharged as much as the light leakage current.

Further, since the sixth transistor P6 is turned on, the cathode electrode of the light receiving element PD is connected with the gate electrode of the first transistor P1 through the second capacitor C2, such that the voltage of the gage electrode node N1 of the first transistor P1 reduces as much as the amount of voltage change of the first capacitor C1.

Assuming that the voltage discharged corresponding to the light leakage current is 1V, the voltage of the gate electrode node N1 of the first transistor reduces to "$V_{REF1} - V_{TH,P1} - \Delta V$". However, $\Delta V$ changes in accordance with the brightness of ambient light and the time of the second period t2.

Further, as shown in FIG. 2, a low-level initializing signal pre is applied to the gate electrode of the eighth transistor P8 at a specific period before the second period t2 is finished, and accordingly, the eighth transistor P8 is turned on and the output signal line OUT is charged by the high-level first power source VDD. The time point where the low-level initializing signal pre is applied may be a predetermined period within the second period t2. As the example shown in FIG. 2, this embodiment exemplifies when the initializing signal is applied at the later half period of the second period t2.

After the output signal line OUT is charged to VDD, during the third period t3, the third control signal CS3 is applied at a high level and the fourth control signal CS4 is applied at a low level. (third period t3). Accordingly, the sixth transistor P6 is turned off and the seventh transistor P7 is turned on.

Further, since the first transistor P1, as described above, operates in the source follower type, as the seventh transistor P7 is turned on, the first electrode (source electrode) of the first transistor P1 is connected with the output signal line OUT through the seventh transistor P7, and as described above, the output signal line has been charged by VDD. In other words, the voltage applied to the gate electrode of the first transistor P1, that is, $V_{REF1} - V_{TH,P1} - \Delta V$ is lower than the voltage VDD of the source electrode, such that it is turned on.

In this state, since the first transistor P1 operates in the source follower type, the output signal line is discharged up to $V_{G,P1} + V_{TH,P1}$ and the $V_{G,P1}$ is $V_{REF1} - V_{TH,P1} - \Delta V$. As a result, $V_{REF1} - \Delta V$ with the threshold voltage $V_{TH,P1}$ of the first transistor P1 compensated is transmitted to the output signal.

Further, since $\Delta V$ may be changed due to the light leakage current during the third period t3 where the output voltage is transmitted, as described above, it is possible to remove the influence from the light leakage current by keeping the sixth transistor P6 turned off.

However, the electric signal output from the source follower type of light sensor circuit is $\Delta V$, which limits the range of ambient light that can be sensed by a predetermined Integration time (second period) and the size of the first capacitor C1.

$\Delta V$ can be expressed by $$\frac{I_{PHOTO} \cdot t2}{C_1},$$

where $I_{PHOTO}$ is light leakage current and t2 is Integration time (second period).

In other words, when the first capacitor C1 has large electrostatic capacitance or the Integration time (second period) decreases, it is possible to sense high-luminance ambient light, whereas the resolution of sensed signals decreases in low-luminance ambient. On the contrary, when the first capacitor C1 has low electrostatic capacitance or the Integration time (second period) increases, the resolution of sensed signals in low-luminance ambient light increases, whereas it is impossible to sense high-luminance ambient light.

Further, although the source follower type of light sensor circuit has linear output characteristics, the light receiving element, e.g. p-i-m (p-intrinsic-metal diode), and the first capacitor C1 has non-linear discharge characteristics, such that non-linear output characteristics appear, depending on the luminance.

Therefore, another embodiment proposes a multi-frame driving method to increase the range over which ambient light may be sensed and increase resolution at low luminance, by removing the disadvantages.

Figure 3:
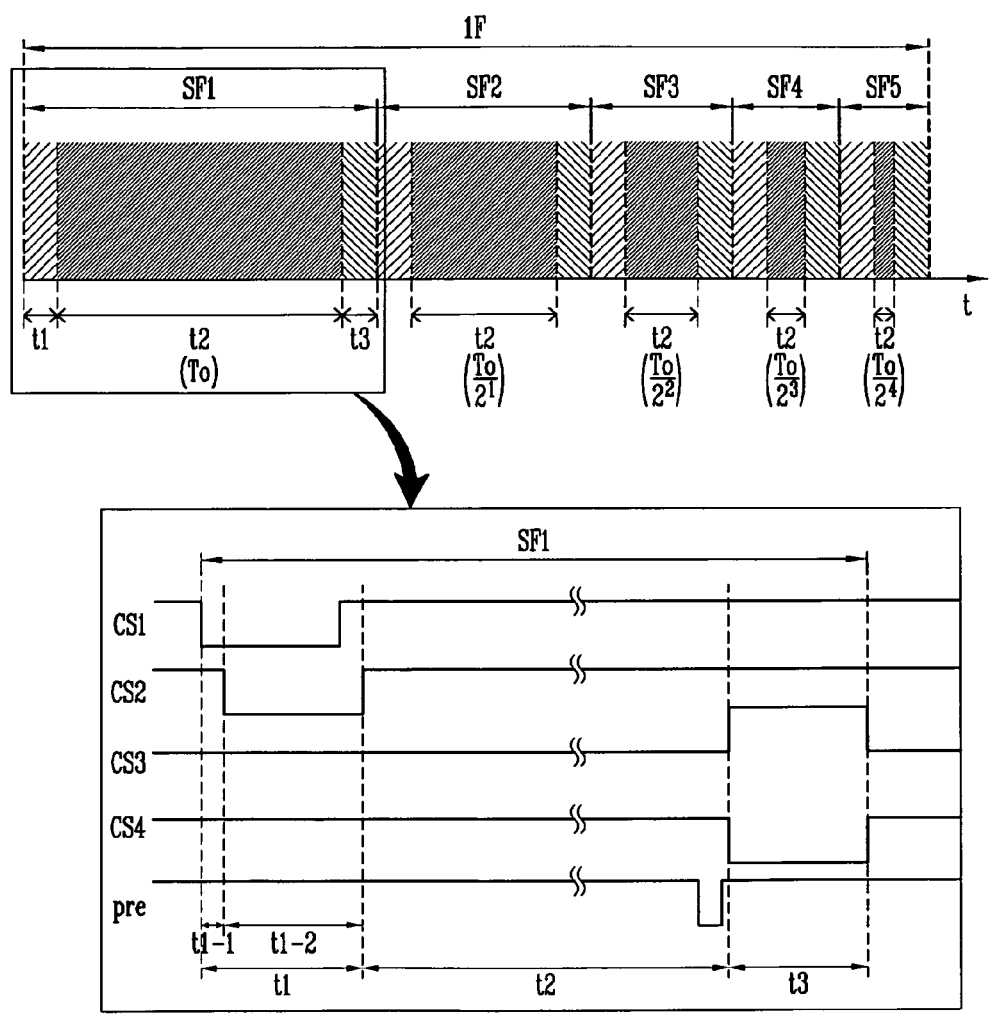
FIG. 3 illustrates a timing diagram showing the operation of a light sensor circuit according to another embodiment.

FIG. 3 is a timing diagram illustrating the operation of a light sensor circuit according to another embodiment. The operation of the embodiment shown in FIG. 3 may be realized using the configuration of the light sensor circuit shown in FIG. 1A or FIG. 1B. Further, although five sub-frames are shown in FIG. 3, this is just an example, and embodiments are not limited thereto.

Referring to FIG. 3, the multi-frame driving method performs m sub-frame operations for one frame period and implements the operations of the three periods (first period (t1, Reset), second period (t2, Integration), third period (t3, Readout)) described above for each sub-frame.

In other words, while one frame in the embodiment shown in FIG. 2 has a fixed Integration time, the multi-frame driving method has m different Integration times. Within each sub-frame of FIG. 3, the three period of each sub-frame are the same as those described in association with FIG. 2.

The Integration times (second period, t2) for sub-frames shown in FIG. 3 may differ for the previous sub-frame by a factor of two. That is, when the Integration time of the first sub-frame is $T_0$, the Integration time of the n-th sub-frame is $$T_n = \frac{T_0}{2^n}.$$

In this configuration, low-luminance ambient light is sensed in the first sub-frame (SF1) period having the longest Integration time, while high-luminance ambient light is sensed in the fifth sub-frame (SF5) period having the shortest Integration time.

According to the multi-frame method shown in FIG. 3, each of m sub-frames having different Integration times performs m Integrations for one frame period, such that it is possible to sense the magnitude of ambient light in a wide range, without saturation of output voltage, and maintain the resolution at a high level even in low-luminance ambient light. In addition, it is possible to output high-bit ambient light signals, using a low-bit ADC.

Further, the analog signals output by the multi-frame driving method shown in FIG. 3 is interpolated by high-bit digital output through multiplication with an analog-digital converter ADC.

In other words, analog voltage output for each sub-frame is converted into a digital signal, for example, through a 12-bit ADC, and the digital signal converted for each sub-frame is multiplied by a coefficient of $2^n$.

That is, when the output signal of the n-th sub-frame is multiplied by a coefficient of $2^n$, $$\Delta V_n * 2^n = \frac{I_{PHOTO} * T_n}{C_1} * 2^n = \frac{I_{PHOTO} * \frac{T_0}{2^n}}{C_1} * 2^n = \Delta V$$

($\Delta V_n$: the output signal of n-th sub-frame and $I_{PHOTO}$: light leakage current), such that the same result as the output signal of the first sub-frame is obtained. It is possible to acquire a 16-bit digital signal by interpolation using the digital output signal for sub-frames which are obtained by the calculation.

Further, the light leakage current of the light receiving element (e.g. p-i-m (p-intrinsic-metal diode) depends on the magnitude of incident light in the reverse bias state. The light leakage current is larger than a thermal leakage current component of the light receiving element itself, such that light can be sensed.

However, when the glass substrate with the light sensor circuit increases in temperature, the thermal leakage current may correspondingly rapidly increases, which may cause malfunction of the source follower type of light sensor circuit.

Accordingly, an embodiment may overcome the problem by removing the thermal leakage current component in the leakage current components of the light receiving element.

In other words, in order to remove only the thermal leakage current component, a light sensor circuit (second light sensor circuit) using a light receiving element having a light-shielding layer is required, other than the light sensor circuit (first light sensor circuit) shown in FIG. 1 and a difference in signals output from the first and second light sensor circuits should be calculated.

In this configuration, the light receiving element of the second light sensor circuit has a light-shielding layer at the outside, such that it is not influenced by external light and generates only leakage current according to temperature. However, the configuration of the second light sensor circuit is the same as the light sensor circuit shown in FIG. 1A and FIG. 1B described above, except that the light receiving element is equipped with the light-shielding layer, and the operation is the same. Therefore, the detailed description is not provided.

The principle of removing the thermal leakage current component can be expressed as the following equations, $$\Delta V_{NOBLK} = \frac{(I_{PHOTO} + I_{THERMAL}) * T_{INT}}{C_1}$$

$$\Delta V_{BLK} = \frac{(I_{THERMAL}) * T_{INT}}{C_1}$$

$$\Delta V_{BLK} - \Delta V_{NOBLK} =$$
$$\frac{(I_{THERMAL}) * T_{INT} - (I_{PHOTO} + I_{THERMAL}) * T_{INT}}{C_1} = -\frac{(I_{PHOTO}) * T_{INT}}{C_1}$$

where $\Delta V_{NOBLK}$ is a signal output from the first light sensor circuit without a light-shielding layer and $\Delta V_{NOBLK}$ is a signal output from the second light sensor circuit with a light-shielding layer.

Therefore, as can be seen from the equations, the leakage current output from the light receiving element of the first light sensor circuit includes the light leakage current and thermal leakage current components, whereas the leakage current output from the light receiving element of the second light sensor circuit includes only the thermal leakage current component.

Further, the output of the first and second light sensor circuits is achieved by subtraction in a differential amplifier and converted into a digital signal by the ADC. However, it may be possible to obtain a difference in two signals, using a digital subtractor directly through the ADC, without using the differential amplifier.

Accordingly, a 16-bit linear output signal is finally output through the interpolation of the multi-frame driving described above, by using the converted digital signal and the temperature information.

Therefore, it is possible to prevent the output current of the light sensor circuit from being changed by the temperature leakage current, by calculating the difference in the signals output from the first and second light sensor circuits such that the temperature leakage current component is removed without using a specific temperature sensor.

By way of summation and review, in the related art, a light sensor, a substrate, and a circuit need to be mounted on a separate substrate, i.e., other than the main substrate having a flat display panel, in manufacturing the light sensor circuit, and electrically connect the separate substrate with the main substrate. Therefore, the flat panel displays increase in size, thickness, complexity and power consumption.

Further, in the light sensor circuit of the flat panel displays of the related art, the output current is changed by light leakage current in the light sampling period, such that it may fail to accurately sample ambient light. Further, in the light sensor circuit of the related art, as ambient temperature increases, the output current of the light sensor circuit is changed by temperature leakage current, such that it is hard to accurately sense the ambient light.

According to embodiments, resolution at low luminance may be improved and the range of sensible ambient light may be increased by divisionally driving a frame period, in which light is sensed, into a plurality of sub-frames.

Further, according to embodiments, by removing a temperature leakage current component, using a light receiving element equipped with a light-shielding layer, without using a specific temperature sensor, such that output current of the light sensor circuit is prevented from being changed by temperature leakage current, thereby preventing malfunction of a light sensor circuit.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A light sensor circuit, comprising:
   a first transistor connected between a first reference voltage and a second power source;
   a second transistor connected between a gate electrode and a second electrode of the first transistor, the second transistor including a gate transistor receiving a first control signal from the gate electrode;
   a third transistor connected between the first reference voltage and the first transistor, the third transistor including a gate electrode receiving a second control signal;
   a fourth transistor connected between the second power and the first transistor, the fourth transistor including a gate electrode receiving an inverted second control signal;
   a light receiving element connected between the second reference voltage and the third reference voltage;
   a fifth transistor connected between the second reference voltage and a cathode of the light receiving element, the fifth transistor including a gate electrode receiving the first control signal;
   a first capacitor connected between the cathode of light receiving element and the third reference voltage;
   a sixth transistor connected between the cathode of the light receiving element and a first electrode of the first capacitor, the sixth transistor including a gate electrode receiving a third control signal; and
   a second capacitor connected between the gate electrode of the first transistor and a first electrode of the first capacitor.

2. The light sensor circuit as claimed in claim 1, further comprising:
   a seventh transistor connected between the first electrode of the first transistor and a first side of an output load, the seventh transistor including a gate electrode receiving a fourth control signal; and
   an eighth transistor connected between an output signal line extending to a second side of the output load and the first power source, the eighth transistor including a gate electrode receiving an initializing signal.

3. The light sensor circuit as claimed in claim 1, wherein the light receiving element is any one of a p-i-m (p-intrinsic-metal) diode, a PIN diode, a PN diode, and a photo coupler.

4. The light sensor circuit as claimed in claim 1, wherein the first reference voltage and the second reference voltage have a high-level voltage value.

5. The light sensor circuit as claimed in claim 1, wherein the third reference voltage $V_{REF3}$ and the second power source VSS are implemented by low-level voltage or a grounding power source GND.

6. The light sensor circuit as claimed in claim 1, wherein at least one of the second transistor, the fifth transistor, and the sixth transistor is a dual gate type.

7. The light sensor circuit as claimed in claim 1, further comprising:
   a ninth transistor supplied with the first control signal inverted by the gate electrode, the ninth transistor having first and second electrodes connected with the gate electrode of eh first transistor; and
   a tenth transistor supplied with a third control signal inverted by the gate electrode, the tenth transistor having first and second electrodes connected with a first electrode of the first capacitor.

8. A method of driving a light sensor circuit as claimed in claim 1 in which one frame is divided into three periods t1, t2, and t3 and the light sensor circuit according to claim 1 operates in the frame period, the method comprising:
   implementing a light receiving element in a reverse bias state by storing threshold voltage of a first transistor in a second capacitor and charging the cathode of the light receiving element to second reference voltage in the first period t1;
   discharging the first capacitor, which stores voltage by the light leakage current generated in accordance with the amount of light traveling into the light receiving element, to correspond to light leakage current in the second period t2; and
   outputting information on the voltage discharged in accordance with the light leakage current to an output signal line in the third period t3.

9. The method as claimed in claim 8, wherein implementing the light receiving element includes:
   receiving a first control signal as a selection signal;
   initializing the voltage of a gate electrode node of the first transistor into a second power source;
   after initializing the voltage, receiving the first control signal and a second control signal as selection signal; and
   charging the gate electrode node of the first transistor with "first reference voltage—threshold voltage of the first transistor".

10. The method of as claimed in claim 8, wherein discharging the first capacitor includes providing a third control signal as a selection signal to turn on a sixth transistor to then correspondingly decrease the voltage of the gate electrode node of the first transistor is by up to the amount of voltage change of the first capacitor.

11. The method as claimed in claim 8, wherein discharging the first capacitor further includes receiving an initializing signal as a selection signal and turning on an eighth transistor in a predetermined period of the second period, and then charging an output line with a first power source.

12. The method as claimed in claim 8, wherein outputting information includes providing a fourth signal as a selection signal to turn on a seventh transistor is turned on to then discharge the voltage in accordance with the light leakage current is output to an output signal line through the seventh transistor.

13. A method of driving a light sensor circuit as claimed in claim 1 in which one frame is composed of a plurality of sub-frames, the sub-frames are divided into three periods t1, t2, and t3 and the light sensor circuit according to claim 1 operates in the periods, the method comprising:
   implementing a light receiving element in a reverse bias state by storing threshold voltage of a first transistor in a second capacitor and charging the cathode of the light receiving element to second reference voltage in the first period;
   discharging the first capacitor, which stores voltage by the light leakage current generated in accordance with the amount of light traveling into the light receiving element, to correspond to light leakage current in the second period; and
   outputting information on the voltage discharged in accordance with the light leakage current to an output signal line in the third period,
   wherein the second period of each of the sub-frame is sequentially shortened by a multiple of 2 from a second period time T0 of the first sub-frame.

14. The method as claimed in claim 13, wherein low-luminance light is sensed in the first sub-frame having the longest second period and high-luminance light is sensed in the last sub-frame having the shortest second period.

15. The method as claimed in claim 13, wherein implementing the light receiving element in a reverse bias state includes:
   receiving a first control signal as a selection signal;
   initializing the voltage of a gate electrode node of the first transistor into a second power source;
   receiving the first control signal and a second control signal as selection signals after initializing; and
   charging the gate electrode node of the first transistor with "first reference voltage—threshold voltage of the first transistor."

16. The method of as claimed in claim 13, wherein discharging the first capacitor includes providing a third control signal as a selection signal to turn on a sixth transistor is turned on then to decrease the voltage of the gate electrode node of the first transistor by up to the amount of voltage change of the first capacitor.

17. The method as claimed in claim 13, wherein discharging the first capacitor includes further includes receiving an initializing signal as a selection signal to turn on an eighth transistor in a predetermined period of the second period, and then charging an output line with a first power source.

18. The method as claimed in claim 13, wherein outputting information includes providing a fourth signal as a selection signal to turn on a seventh transistor is turned on, and then the voltage discharged in accordance with the light leakage current is output to an output signal line through the seventh transistor.

19. A method of sensing light using a light sensor circuit as claimed in claim 1, the method comprising:
   providing another light sensor circuit as claimed in claim 1;
   shielding the another light sensor circuit from light; and
   subtracting an output of the another light sensor circuit from an output of the light sensor circuit to provide a corrected output.

* * * * *